United States Patent [19]

Guichard

[11] Patent Number: 4,580,744
[45] Date of Patent: Apr. 8, 1986

[54] METHOD AND APPARATUS FOR CONTROLLING BRAKING OF AN AIRCRAFT DURING LANDING ONCE THE MAIN LANDING GEAR HAS MADE CONTACT WITH A RUNWAY AND BEFORE THE NOSE LANDING GEAR HAS MADE CONTACT

[75] Inventor: Jean Guichard, La Garenne Colombes, France

[73] Assignee: Messier-Hispano-Buagatti (S.A.), Montrouge, France

[21] Appl. No.: 585,085

[22] Filed: Mar. 1, 1984

[30] Foreign Application Priority Data

Mar. 8, 1983 [FR] France ............................... 83 03750

[51] Int. Cl.⁴ ............................................. B64L 25/42
[52] U.S. Cl. ................... 244/111; 244/110 A
[58] Field of Search ................ 244/111, 183, 103 W, 244/110 A, 110 D; 318/583; 364/426, 428, 439

[56] References Cited

U.S. PATENT DOCUMENTS 2,854,098  9/1958  Griswold ............................ 244/111
4,076,331  2/1978  De Vlieg ............................ 244/111

FOREIGN PATENT DOCUMENTS 3231162  2/1984  Fed. Rep. of Germany ...... 244/111

Primary Examiner—Galen L. Barefoot
Assistant Examiner—Rodney Corl
Attorney, Agent, or Firm—Sughrue, Mion, Zinn, Macpeak, and Seas

[57] ABSTRACT

The method of controlling aircraft braking during landing on a runway as soon as the running gear of the main landing gear has made runway contact and prior to the nose gear making contact, comprises: determining the value of the nose-up angle $\Delta$ of the aircraft as soon as it makes runway contact with its main landing gear; providing a signal representative of the value of the nose-up angle; and controlling braking of the aircraft by any appropriate braking apparatus as a function of a magnitude representative of the signal to ensure acceptable variation of said nose-up angle.

7 Claims, 2 Drawing Figures

METHOD AND APPARATUS FOR CONTROLLING BRAKING OF AN AIRCRAFT DURING LANDING ONCE THE MAIN LANDING GEAR HAS MADE CONTACT WITH A RUNWAY AND BEFORE THE NOSE LANDING GEAR HAS MADE CONTACT

The present invention relates to a method and to apparatus for enabling an aircraft's braking to be controlled on landing as soon as the main landing gear has made ground contact on a runway and before the nose landing gear had made contact.

BACKGROUND OF THE INVENTION

When an aircraft, and in particular an aircraft moving at high speed such as a fighter plane, lands on a runway in a nose-up attitude, ground contact is initially made by means of the main landing gear before the secondary landing gear or nose wheel comes into contact with the runway.

This results in the aircraft running a non-negligible distance along the run way in the nose-up attitude.

In the prior art, and with very few exceptions, the pilot can control the aircraft's braking by any suitable means in order to stop the aircraft in as short a time and as short a distance as possible, only once the wheels of all three landing gears have made contact with the ground.

Particularly, but not exclusively, in this aviation context, there is a need to keep aircraft on a runway for as little time as possible. This can be for safety reasons, or to free the runway for other aircraft to land as soon as possible after an earlier landing, or perhaps more commonly, simply to use a very short length of runway.

On analyzing prior art braking systems, such as those outlined above, it can be seen that braking commences only once all three wheels or sets of wheels, ie. two main landing gear and one nose gear, have made contact with the ground. A large portion of the runway, sometimes several hundreds of meters long, is thus not used for aircraft braking, thereby causing runways to be relatively long.

Preferred implementations of the present invention provide a method of selectively controlling aircraft braking on landing as soon as there is ground contact, thereby slowing down the aircraft as soon as possible and thus shortening the length of runway required.

The present invention also relates to apparatus for implementing the method.

SUMMARY OF THE INVENTION

The present invention provides a method of controlling aircraft braking during landing on a runway and as soon as the running gear of the main landing gear has made runway contact and prior to the nose gear making contact, the method comprising:

determining the value of the nose-up angle of the aircraft as soon as it makes runway contact with its main landing gear;

providing a signal representative of the value of said nose-up angle; and controlling braking of said aircraft by any appropirate means as a function of a magnitude representative of said signal to ensure acceptable variations of said nose-up angle.

The present invention also provides apparatus for controlling aircraft braking during landing on a runway and as soon as the running gear of the main landing gear has made runway contact and prior to the nose gear making contact, the apparatus comprising:

means for determining the value of the nose-up angle of the aircraft as soon as it makes runway contact with its main landing gear;

means for providing a signal representative of the value of variation in said nose-up angle; and means for controlling braking of said aircraft as a function of a magnitude representative of said signal to ensure acceptable variation of said nose-up angle.

BRIEF DESCRIPTION OF THE DRAWINGS

Two embodiments of the invention are described by way of example with reference to the accompanying drawings, in which.

MORE DETAILED DESCRIPTION

Figure 1:
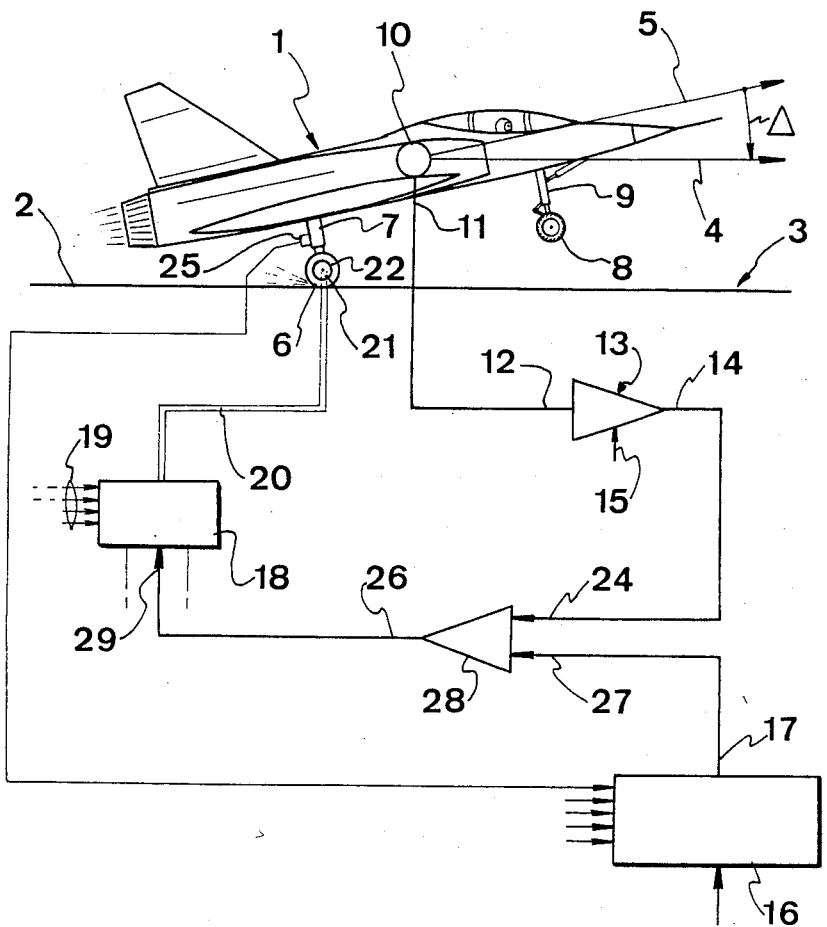
FIG. 1 is a schematic diagram of a first apparatus in accordance with the invention.

The method of controlling the braking of an aircraft 1 during landing as soon as its main landing gear has made contact with the ground 2 of a runway 3 consists in determining the nose-up angle $\Delta$ of the aircraft 1 relative, for example, to the plane of the runway 3. The angle $\Delta$ is the angle between a direction 4 parallel to the plane of the runway 3 and the aircraft's direction of propagation 5. The angle $\Delta$ may be determined by any suitable means, and is preferably determined by the means described below. A signal having a value representative of the angle $\Delta$ is then provided as from the moment the aircraft 1 touches the ground 2 by means of the wheels 6 on its main landing gear, and prior to the wheel 8 of the nose landing gear 9 making contact with the ground 2.

The measurement of the nose-up angle $\Delta$ is performed continuously, and the signal provided is capable of representing variations in the value of the nose-up angle $\Delta$.

Broadly speaking, the signal representative of the variation in the nose-up angle is used to control the aircraft braking as soon as contact is first made with the ground in order to begin stopping the aircraft as soon as possible. However, the braking must be performed selectively in order to avoid too abrupt a stop, and in particular in order to avoid swinging the aircraft nose down too quickly, ie. to avoid slamming the nose wheel 8 hard onto the ground.

If the nose swings down too quickly, there is a danger of the nose landing gear 9 collapsing.

Thus, under such conditions, the braking of the main landing gear wheels 6 must be progressively applied as soon as the wheels make ground contact so as to ensure that the nose-up angle $\Delta$ does not vary at more than a predetermined maximum rate.

It can thus be seen that in one implementation of the method defined above, braking may commence as soon as the aircraft main landing wheels 6 touch down. This makes it possible to use shorter runways for landing. A small amount of fuel is also saved, and the runway can be cleared for the next landing more quickly, thereby making it possible to increase aircraft turn over on a runway, eg. land an entire fighter squadron in less time than before.

Figure 2:
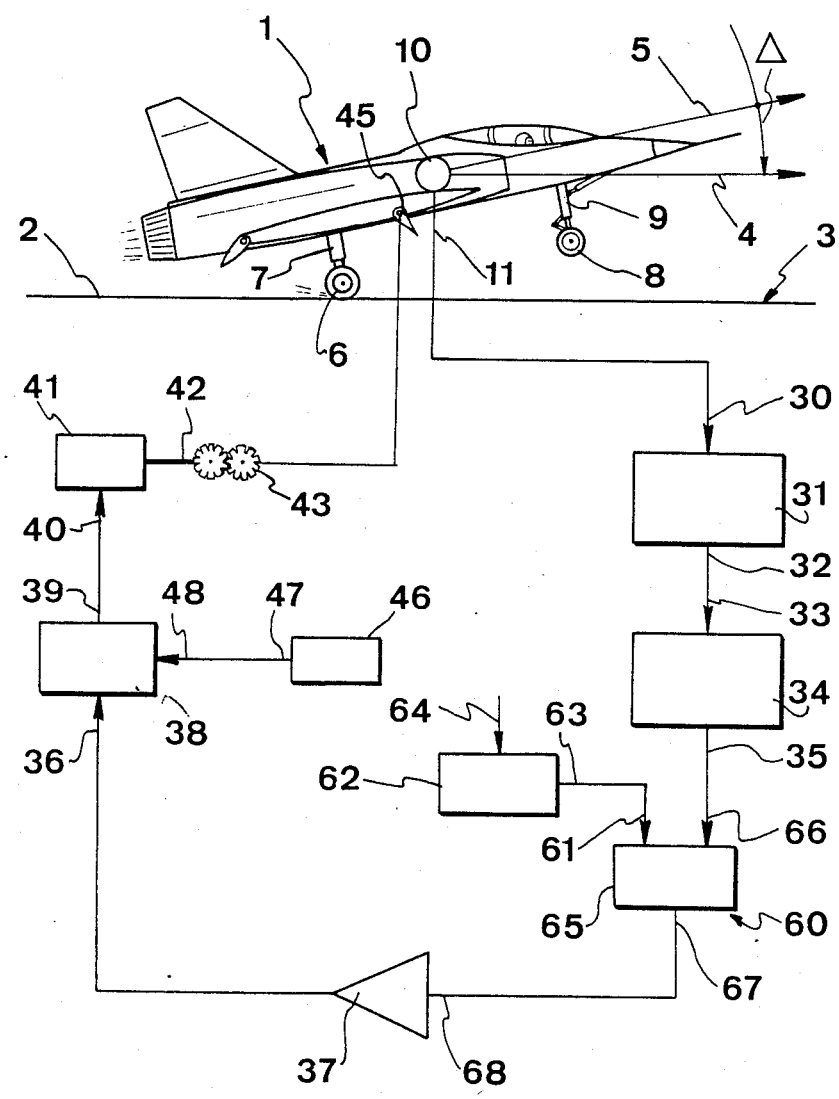
FIG. 2 is a similar diagram to FIG. 1, but showing a second apparatus in accordance with the invention.

FIGS. 1 and 2 are diagrams showing two different embodiments of apparatus for performing the above-described method. FIG. 1 relates to a disk brake system, while FIG. 2 relates to an air-brake type of system.

Where the same items appear in both figures, they have the same reference numerals in each of them.

With reference to FIG. 1, the apparatus for controlling braking is constituted by various means which are carried on board the aircraft.

The apparatus comprises a generator 10 having an output 11 at which it delivers a signal representative of the value of the angle $\Delta$ between the direction of propagation of the aircraft when running on all three wheels, ie. a direction which is parallel to a plane passing substantially through the contact points of the landing gear, and a direction 4 which is parallel to the plane of the runway 3, and which can generally be taken to be horizontal.

The generator 10 may be constituted, for example, by an inertia system, eg. a mechanical gyroscope, or by a laser system, both of which are known per se and readily available in the aviation industry.

The output 11 is connected to the input 12 of an amplifier 13 (or a multiplier per se) to multiply the signal by a given factor and to deliver a corrected signal at an output 14. The amplifier multiplication factor is itself controllable by means of a control input 15 to the amplifier.

The apparatus further includes a generator 16 for delivering a brake application signal at its output 17. The brake itself is actuated by a pressurized fluid control means eg. a servovalve 18, having an inlet 19 for fluid under pressure and outlet pipework 20 for applying controlled pressure to disk brake actuator 21. The disk brakes 22 form part of the running gear of the main landing gear 7.

When the above-described method is implemented, the output 17 of the generator 16 is connected to the control input 29 of the servovalve 18 via a differential amplifier 28 having one of its inputs 27 connected to the output 17 from the generator 16 and an output 26 connected to the servovalve control input 29.

In conventional manner, the generator 16 delivers a braking control signal at its output 17 which takes in account a whole set of predetermined parameters such as aircraft real velocity, the rolling speed of the braked wheels, etc.

Such a braking system comprising the generator 16, the servovalve 18, the pipework 20, the actuator 21 and the disk brakes 22 are not described in greater detail since they are well known, and in particular the assignee has been selling such systems for many years.

In the context of the present invention, the output 14 from the amplifier 13 is connected to the other input 24 of the differential amplifier 28. The apparatus described above operates as follows:

As soon as the aircraft 1 makes contact with the ground 2 by means of its main landing wheels 6, the control generator 16 is engaged to apply the aircraft's brakes by causing fluid under pressure to be delivered to the disk brake actuator 21;

Means for determining the moment of contact may be constructed from contact switches 25 responsive to the degree to which the main landing gear shock absorbers are compressed, and capable of delivering a control signal to the generator 16; alternatively, the speed of rotation of the wheels 6 may be sensed.

In aviation, braking is performed by constant application of fluid under pressure to the disk actuators, but in conjunction with pressure-attenuating signals which are generated when softer braking is required.

Under such conditions, when the aircraft is in the nose-up position shown in FIG. 1, the angle sensing generator 10 delivers an output signal of large amplitude since the nose-up angle $\Delta$ is at its maximum value. This signal passes from the output 11 to be weighted where necessary by the multiplier 13 and is then applied to the other input 24 of the differential amplifier 28 which compares the weighted nose-up angle signal with the signal from the generator 16. Thus the signal at the amplifier output 26 has a value which controls the applied braking force in such a manner that the nose-up angle and its rate of change are acceptable.

Generally speaking, it is nontheless relatively difficult to give a worked example of the aircraft braking method since many details depend on the aircraft geometry.

However, the braking program can readily be established by the person skilled in the art for any one type of aircraft, simply by performing tests. While the nose-up angle is large, braking can be quite hard since the aircraft may be held at this angle for some time due to lift generated by its speed. The important constraint is that the speed at which the nose-up angle $\Delta$ varies should not be too large, and in particular should not exceed a threshold value. An optimal nose-up angle $\Delta$ thus needs to be defined as a function of the structure and of the speed of the aircraft for optimizing braking while keeping the rate at which the angle $\Delta$ varies within limits. It should be observed that the rate of variation in the angle $\Delta$ is also a function of the angle $\Delta$. The braking control program thus needs to take account both of the absolute value of the angle $\Delta$ and also of its rate of variation.

The advantageous aspect of the apparatus enabling braking to start sooner than is possible with prior art apparatus can thus be seen.

The apparatus described above improves landing conditions by applying the brakes as soon as the aircraft touches the ground. However, it may on occasion be advantageous to further increase braking capacity by using additional braking means, eg. air-brakes.

FIG. 2 shows an embodiment of the invention using air-brakes. The angle-sensing generator 10 has its output 11 connected to the input 30 of a forming circuit 31 which delivers at its output 32 a signal (eg. an electrical signal) whose amplitude is representative of the value of the angle $\Delta$ as defined above. The output 32 is connected to an input 33 of a differentiator circuit 34 for delivering at the output 35 thereof, a signal representative of the derivative of the signal applied to its input 33. The output 35 is connected, advantageously via a threshold device 60 and an amplifier 37, to one input 36 of a comparator 38 having its output 39 connected to a control input 40 of a motor unit 41. The motor unit 41 is mechanically connected, eg. via a shaft 42 and gears 43 to an air-brake panel 45.

The threshold detector 60 comprises, for example, a generator 62 which deliver at its output 63 a signal which is advantageously adjustable via a control input 64.

The threshold detector 60 further comprises a logic gate 65 having two inputs 61 and 66 respectively connected to the output 63 of the generator 62 and the output 35 of the differentiator 34.

The output 67 of the threshold detector logic gate 65 is connected to the input 68 of the amplifier 37.

The logic gate 65 is of the type which passes a signal applied to its input 66 so long as said signal is of smaller amplitude than the signal applied to its other input 61. However, when the signal applied to the input 66 exceeds the amplitude of the signal applied to the input 61, the signal at the output 67 is locked to the threshold level, ie. to the level of the signal applied to the input 61.

Advantageously, the apparatus further includes a sensor 46 for sensing the position of the air-brake 45, with the output 47 from said sensor 46 being connected to the second input 48 of the comparator 38.

There are no particular difficulties associated with implementing air-brake 45 placing by the motor 41, since such air-brakes are common practice, and frequently under pilot control. The apparatus described above operates as follows:

The signal delivered at the output 11 from the inertia sensor 10 (for example) is applied to the input 30 of the forming circuit 31. The signal which appears at the output 32 threof represents the value of the nose-up angle of the aircraft 1. In other words this signal continuously represents the angle $\Delta$. It is applied to the differentiator circuit 34 whose output signal thus continuously represents the amplitude of variations in the angle $\Delta$. As mentioned above, the angle $\Delta$ should vary continuously, but at a rate less than some acceptable maximum value for the aircraft, ie. it must not vary too quickly in order to ensure that the nose wheel 8 does not slam against the ground.

Tests will need to be performed to determine the maximum acceptable value for any particular aircraft design. The derivative signal is transmitted through the logic gate 65 so long as it remains below the value of the signal applied to the input 61. The signal applied at the output 67 of the logic gate is thus used directly (including an optional scale factor applied by the amplifier 37) via the comparator 38, the motor 41 and the gears 43 to vary the angular position of the air-brake 45.

When the air-brake has taken up the desired position corresponding the value of the signal applied to the input 36, the sensor 46 delivers a signal representative of this position, thereby cancelling the effect of the control signal on the motor 41.

Thus, the position of the air-brake is thus servo controlled as a function of variation in the nose-up angle $\Delta$, with a safety cutoff provided by the threshold detector 65.

The apparatus described above thus has the same advantages as that described with reference to FIG. 1 since it enables aircraft braking to commence as soon as contact is made with the ground by the main landing gear, and before the nose landing gear makes contact.

Two means of aircraft brake control have been described above using either disk brakes acting on the aircraft wheels or air-brakes.

It will readily be understood that both means of brake control could be implemented together using the same means for sensing the nose-up angle $\Delta$. Further, electronic control means responsive to the nose-up angle $\Delta$ could be arranged to control both braking systems in conjunction or separately in order to provide optimal braking with minimal variation in the nose-up angle.

I claim:

1. Apparatus for controlling aircraft braking during landing on a runway and as soon as the running gear of the main landing gear has made runway contact and prior to the nose gear making contact, the apparatus comprising:
    means for determining the value of the nose-up angle of the aircraft as soon as it makes runway contact with its main landing gear;
    means for providing a signal representative of the value of variation in said nose-up angle; and
    means for controlling braking of said aircraft as a function of a magnitude representative of said signal to ensure acceptable variation of said nose-up angle.

2. Apparatus according to claim 1, wherein said means for determining the value of the nose-up angle of said aircraft comprise an inertia sensor.

3. Apparatus according to claim 1, wherein said means for braking of said aircraft as a function of a magnitude representative of said signal includes disk brakes.

4. Apparatus according to claim 2, wherein said means for braking of said aircraft as a function of a magnitude representative of said signal includes disk brakes.

5. Apparatus according to claim 1, wherein said means for braking of said aircraft as a function of a magnitude representative of said signal includes air-brakes.

6. Apparatus according to claim 2, wherein said means for braking of said aircraft as a function of a magnitude represetnative of said signal includes air-brakes.

7. A method of controlling aircraft braking during landing on a runway and as soon as the running gear of the main landing gear has made runway contact and prior to the nose gear making contact, said method comprising:
    determining the value of the nose-up angle of the aircraft as soon as it makes runway contact with its main landing gear;
    providing a signal representative of the value of said nose-up angle; and
    controlling braking of said aircraft in response to the magnitude of said signal to ensure acceptable variation of said nose-up angle.

* * * * *